United States Patent Office 2,852,508
Patented Sept. 16, 1958

2,852,508

PRECIPITATION OF DICARBOXYLIC ACID ESTERS OF CELLULOSE ETHERS AND LOWER FATTY ACID ESTERS

Gordon D. Hiatt and Carlton L. Crane, Rochester, N. Y., assignors to Eastman Kodak Company, Rochester, N. Y., a corporation of New Jersey No Drawing. Application March 20, 1956
Serial No. 572,635

7 Claims. (Cl. 260—226)

This invention relates to a method for separating the higher viscosity dicarboxylic acid esters and ethers of cellulose or of polyvinyl alcohol or polyvinyl acetate from their reaction mixtures in which acetic acid is used as a solvent, a basic salt such as sodium acetate is used as the catalyst and a dicarboxylic anhydride is used as the esterifying anhydride. This method involves the application of cooling together with the direct addition of water to the esterification bath after the esterification has been completed.

In the making of dicarboxylic acid esters of cellulose compounds or of hydrolyzed polyvinyl acetate, the usual procedure has been to react upon the cellulose compound or the hydrolyzed polyvinyl acetate with a dicarboxylic acid anhydride, such as phthalic anhydride, together with a basic catalyst. In times past, this catalyst has often been pyridine. More recently processes have been developed in which acetic acid is employed as the solvent and an acid soluble acetate showing a basic reaction therein such as sodium acetate, potassium acetate, pyridine acetate and the like, is employed as the catalyst to esterify cellulosic material or a hydrolyzed polyvinyl acylate (such as polyvinyl alcohol or acetate) with a dicarboxylic acid anhydride such as phthalic anhydride, nitrophthalic anhydride, succinic anhydride, maleic anhydride, or the like as described and claimed in U. S. Patent No. 2,759,925 of Hiatt, Mench, and Emerson or in U. S. Patent No. 2,759,909 of Hiatt and Emerson.

In previous processes where dicarboxylic acid esters having substantial viscosity have been prepared, it has been necessary in separating the products from the reaction mass to first dilute with a solvent material such as acetic acid, acetone, aqueous trisodium phosphate, aqueous sodium carbonate, or the like. This dilution of the reaction mass in connection with the separation of the ester therefrom is time-consuming, increases the difficulty of removing phthalic or other dicarboxylic acid from the product which is prepared and cannot be carried out in the container in which the esterification was performed due to the increased volume which results, upon dilution of the mass. Oftentimes this dilution, formerly considered necessary, has increased the cost of the operation to such an extent that the process has been considered as not useful commercially.

One object of our invention is to provide a method of separating a dicarboxylic acid ester of a cellulose derivative or of a hydrolyzed polyvinyl acylate from the reaction mass in which it was prepared without any dilution thereof being necessary. Another object of our invention is to provide a method of precipitating a dicarboxylic acid ester of a polymeric material from the reaction mass in which it was prepared in which the only addition to the reaction mass is the direct addition of water thereto. A further object of our invention is to provide a method of separating dicarboxylic acid esters of polymeric materials from the reaction mass in which they have been prepared in which cooling to drop the temperature of the mass is employed to facilitate the operation. A still further object of our invention is to provide a method of precipitating dicarboxylic acid esters of polymeric materials from the reaction mass in which they were prepared in which the dicarboxylic acid therein is not concurrently precipitated from the mass and consequently the purification of the dicarboxylic acid ester product is facilitated. Other objects of our invention will appear herein.

Our invention is adapted to the separation of dicarboxylic acid esters of polymeric materials from the reaction masses in which they are prepared in cases where the product is of a substantial viscosity and the amount of liquid which was employed in their preparation was limited. In such cases dilution has been thought previously to have been necessary but we have found that after a dicarboxylic acid ester of a cellulose derivative or of a hydrolyzed polyvinyl acylate is prepared as described herein, the product may be conveniently separated from the mass without any dilution thereof merely by the application of cooling and the direct addition of water after the completion of the esterification. In some cases it may also be desirable to add a small amount of an acid such as hydrochloric or sulfuric acid for the purpose of neutralizing the basic catalytic material preferably after the water addition. Our invention is particularly directed to the separation of such esters as cellulose acetate phthalate, ethyl cellulose phthalate or polyvinyl phthalate from the reaction masses in which they are prepared. The amount of liquid added is sufficiently small that the precipitation of the ester can ordinarily be carried out directly in the vessel in which the esterification had been performed. In addition, the amount of water added is sufficiently small that the mass does not become a nonsolvent for the phthalic or other dicarboxylic acid present therein and therefore the precipitate which is obtained is in good physical form and has a low content of impurities. By means of two or three washings the ester is freed from substantially all of the materials which might be present therein as impurities.

In the precipitation of a dicarboxylic acid ester from the reaction mass in which it was prepared, it has heretofore been necessary in the case of a product having a viscosity of at least a certain value that the reaction mass be first diluted with some diluent prior to the precipitation. For instance, in some cases glacial acetic acid has been regarded as a suitable diluent. In other cases acetone has been used in this connection while in still other cases aqueous solutions of trisodium phosphate have been found to be useful.

Our invention relates to processes in which limited amounts of solvent have been employed. In processes using acetic acid solvent in making dicarboxylic acid esters in which a high solvent proportion is employed, products result which are inferior for many purposes because of their low content of dicarboxylic acid radical. For instance, in the making of cellulose acetate phthalates or cellulose ether phthalates of substantial phthalyl content it is better to use not more than three parts of acetic acid solvent per part of cellulose compound. In the making of the polyvinyl dicarboxylic acid esters more solvent is needed, but 7 parts of acetic acid per part of hydrolyzed polyvinyl acylate is the maximum employed to produce good products.

In processes of this nature for preparing esters of good viscosity, it has been considered necessary to use some type of dilution in the precipitation of the products obtained. For instance, in the case of the ethyl cellulose phthalates having viscosities of at least 2½ centipoises, it has been considered necessary to dilute the reaction mass for satisfactory precipitation. This viscosity is that of a 3% solution of the ethyl cellulose phthalate in a mixture of 70% ethanol, 20% isopropanol and 10% butanol at 25° C.

In the case of the polyvinyl phthalates, it has been considered necessary to dilute the reaction mass prior to precipitation when those esters have viscosities of at least 2½ centipoises, the viscosity being that of a 10% solution in a mixture of 55% ethanol and 45% acetone at 25° C.

In the case of the cellulose acetate phthalates, those having a viscosity of at least 2½ centipoises in a 15% solution of acetone (at 25° C.) have required dilution of the completed reaction mass prior to precipitation to obtain satisfactory separation of the cellulose acetate phthalate therefrom. We have found in the case of any of the above-mentioned materials in which dilution has previously been necessary that by means of our invention in which chilling is used, any dilution with solvent liquid whether acetic acid or something else has been unnecessary.

Our invention relates to the masses obtained in processes of making dicarboxylic acid esters in which the acetic acid solvent has been limited as specified above and in which in the reaction on cellulose acetate not more than 2 parts, in that on cellulose ether not more 3 parts, and in that on hydrolyzed polyvinyl acetate, not more than 4 parts of dicarboxylic anhydride (such as phthalic anhydride) has been used per part of the cellulose or polyvinyl material which was esterified. The esterification is carried out under anhydrous conditions and sufficient phthalyl or other dicarboxylic acid radical is thereby added to impart alkali solubility to the products which are prepared. In the case of celluose acetate phthalates, the phthalyl content should be 14% of the cellulose ether phthalates, at least 8% and the polyvinyl phthalates at least 55% to get alkali solubility.

In its broadest aspects, our invention comprises, without first diluting, the steps of cooling the completed reaction mass to a temperature within the range of 50–100° F. and adding water directly thereto. These steps are conveniently carried out simultaneously at least in part. If desired, the alkali metal salt or pyridine salt which may have been present as the catalyst may be neutralized, such as by the addition of hydrochloric or sulfuric acid in an amount which will combine therewith conveniently after the first or any subsequent additions of water. In some cases the neutralization of the basic salt which was used as the catalyst is particularly desirable, such as when cellulose ether phthalates are prepared.

In the cooling of the reaction mass, cooling below 100° F. and preferably below 85° F. is desirable to prevent gumminess of the product which cooling is preferably either during or before the addition of water to the mass. Too great a cooling such as to below 50° F. may render the mass thick and difficult to mix. As the precipitation is ordinarily carried out in an esterification mixer in which the ester has been prepared, stiffness of the mass may strain or even break the mixer or material might collect on the blades thereof.

In the precipitation of the esters, the amount of water which is added should be so limited that the acidity of the mass is no higher than 35% and no lower than 20%, based on the strength of acetic acid. This means the addition of water in an amount which will supply a total of 2–3.5 parts of water per part of acetic acid which is present in the mass. By thus limiting the amount of water in the precipitation, the acid in the mass is more readily recovered such as for reuse in subsequent operations. The physical form of the precipitate obtained is excellent.

One objection to prior precipitation operations has been that the phthalic acid has precipitated along with the dicarboxylic ester due to the high water content of the mass. In our precipitation method the major proportion of the phthalic acid in the system remains in solution and the precipitate carries only a low content of impurities (phthalic acid and inorganic compounds) which are easily removed without any adverse effect such as might result from excessive soaking. As a result, a product is obtained, after two or three washes with water, which is substantially free of all impurities.

In the making of a dicarboxylic acid ester of a polymeric compound, the mass at the completion of the esterification ordinarily has a temperature of at least 150° F. In order to conveniently separate the ester from the mass in accordance with our invention, water having a temperature of 32–105° F. may be introduced into the reaction bath to reduce the temperature of the mass. The mass is cooled either before or during the addition of the water so that after the water has been added a temperature within the range of 50–100° F. is arrived at. The entire procedure is accompanied by agitation of the mass. The precipitation for convenience is preferably carried out in the mixer or esterification vessel in which the esterification itself was performed. The water works its way into the mass and precipitates the ester in a finely divided, easily dissolved form. In the absence of the cooling and under the conditions described, the ester obtained exhibits a gummy condition. When the basic catalyst present in the mass is regarded as undesirable, acid is introduced, preferably not before the addition of water and usually after the water addition, in a quantity sufficient to convert the base to an inorganic acid salt such as the sulfate.

The following examples illustrate our invention:

Example 1

250 parts of polyvinyl alcohol (hydrolyzed polyvinyl acetate) was mixed with 800 parts of phthalic anhydride and 80 parts of anhydrous sodium acetate in a sigma-bladed mixer and the temperature of the mass was raised to 102° F. 1250 parts of anhydrous acetic acid was added thereto. The mass was stirred and the reaction temperature was raised to 150° F. over a period of three hours and then to 160° F. over a period of seven hours.

The reaction was thereupon complete and cooling water was applied to the jacket of the mixer until the temperature dropped to within the range of 50–100° F. There was then added 3000 parts of distilled water containing 128½ parts of sulfuric acid and the mass was stirred for one hour and 20 minutes. A product was obtained consisting of semi-hardened lumps. The water and acid were removed therefrom, thereby removing the bulk of the phthalic acid from the mass. There was then added to the solid product in the mixer 1000 parts of distilled water, stirring was carried out for 30 minutes and the water was decanted therefrom. A further washing with an additional 1000 parts of distilled water was then employed and the stirring was continued while cooling to a temperature of 34° F. over a period of 30 minutes. The water was decanted therefrom. A fine, hard, granular product was obtained which was washed in successive changes of distilled water until essentially free from uncombined acids. The product obtained was dried and analysis of the product indicated:

Apparent phthalyl, 69.2%
Viscosity at 10% concentration in alcohol:acetone, 55:45, 18.0 cps.
Solubility at 10% concentration in 5% sodium bicarbonate solution, soluble
Ash content, 0.168%

Example 2

150 parts of polyvinyl alcohol (hydrolyzed polyvinyl acetate) was stirred with 480 parts of phthalic anhydride and 48 parts of anhydrous sodium acetate in a sigma-bladed mixer. The temperature was raised to 90° F. and 750 parts of acetic acid were added thereto. The temperature of the mass was raised to 140° F. over one hour and then maintained at 140–146° over five hours.

The mass was cooled by circulating cold brine through the jacket of the mixer and 1500 parts of distilled water was added thereto. The mass was stirred for 20 minutes, during which time temperature dropped from 146° to 82° F. A precipitate was obtained. The liquids were decanted and replaced with 1500 parts of distilled water. The mass was stirred for 30 minutes and the temperature was reduced to 40° F. The wash liquor was removed and replaced with 1500 parts of distilled water and the mass was stirred for 30 minutes during which time the temperature was reduced to 40° F. The product was thereby substantially freed of phthalic acid. A fine granular polyvinyl phthalate powder was obtained. The product was dried at 140° F. and analysis indicated an apparent phthalyl content of 61.8% and a viscosity at 10% concentration in alcohol:acetone, 55:45 of 3.17 cps.

*Example 3*

500 parts of ethyl cellulose of approximately 44% ethoxyl content were mixed together with 1500 parts of phthalic anhydride, 1000 parts of acetic acid and 500 parts of anhydrous sodium acetate in a jacketed sigma-bladed mixer. The temperature of the reaction mass was raised to 184° F. over a period of five hours. The phthalation was thereby completed. Cold brine water was circulated through the jacket of the mixer and 2000 parts of distilled water were added thereto over a period of 15 minutes, during which time the stirring was continued and the temperature of the mass dropped to 90° F. 1000 parts of distilled water containing 304 parts of sulfuric acid were then added to the mixer over a period of ½ hour. The stirring and cooling were continued for 15 minutes, at the end of which time the temperature of the mass was 55° F. A fine granular precipitate was obtained substantially free of phthalic acid. The liquid was decanted from the precipitate and the precipitate was washed two or three times with distilled water to completely free it from salt and phthalic acid. Analysis indicated the product to have an apparent phthalyl content of 29.9% and a viscosity at 3% concentration in ethanol:isopropanol:butanol, 70:20:10 at 25° C. of 5.9 cps.

*Example 4*

500 parts of ethyl cellulose having an ethoxyl content of approximately 45% were mixed with 500 parts of anhydrous sodium acetate, 1000 parts of acetic acid and 500 parts of phthalic anhydride in a jacketed sigma-bladed mixer. The mixture was heated and agitated for 1½ hours at 148–160° F. and for 3½ hours at 160–170° F. whereby the reaction was completed. The reaction mass was then cooled to a few degrees below 100° F. and 2500 parts of cool distilled water was added to the mixer. The mass was stirred for 15 minutes whereupon a precipitate formed and was separated from the liquid. The precipitate was drained, washed in successive changes of distilled water until essentially free from uncombined acids and dried. The product obtained had 23% apparent phthalyl content and a viscosity at 10% concentration in ethanol:acetone, 55:45 at 25° C. of 212 centipoises.

*Example 5*

10 parts of ethyl cellulose having an ethoxyl content of approximately 47% were mixed with 10 parts of phthalic anhydride, 20 parts of acetic acid and 10 parts of anhydrous sodium acetate in a jacketed sigma-bladed mixer. The mixture was stirred for four hours at 140–148° F. whereby phthalation was completed. Coolant was circulated through the jacket of the mixer and 65 parts of distilled water were added to the mass whereby the temperature was dropped to below 85° F. The stirring was continued until precipitation was complete. The precipitate obtained was washed in distilled water until free from impurities. The product was dried and was found to be alkali soluble, to have an apparent phthalyl content of 14.8% and a viscosity at 3% concentration in ethanol:isopropanol:butanol 70:20:10 at 25° C. of 23.8 cps.

*Example 6*

500 parts of cellulose acetate having an acetyl content of approximately 33% were mixed with 600 parts of phthalic anhydride, 750 parts of anhydrous sodium acetate and 1500 parts of acetic acid in a jacketed sigma-bladed mixer. The mass was stirred for eight hours at 163–173° F. whereby phthalation was completed. It was then cooled by circulating brine water through the jacket of the mixer. 5000 parts of distilled water were added to the mixer and the mass was stirred for 40 minutes whereupon precipitation occurred, the temperature of the mass having been reduced to 80° F. The liquid was decanted and the precipitate was washed by stirring twice for 30-minute periods each with 5000 parts of distilled water. After washing the precipitate obtained with distilled water until essentially free from uncombined acids and salt, the product was dried and analyzed. A granular product of good quality was obtained. It was found to have an apparent phthalyl content of 35.5%. Its viscosity at 15% concentration in acetone at 25° C. is 125 cps.

This application is a continuation in part of our application Serial No. 294,272, filed June 18, 1952, entitled "Method of Separating Dicarboxylic Acid Esters of Polymeric Materials from the Reaction Mixture in which they are Prepared," now abandoned.

We claim:

1. A method of preparing cellulose dicarboxylic acid esters which comprises reacting upon a cellulose material selected from the group consisting of the cellulose ethers and the lower fatty acid esters of cellulose containing free and esterifiable hydroxyl groups with a bath essentially consisting of not more than 3 parts of dicarboxylic acid anhydride as the esterifying reagent, not more than 3 parts of a lower fatty acid as the solvent therein and a basic catalyst per part of cellulose material for a sufficient time to assure an alkali soluble product followed by cooling the reaction mass to 50–100° F. and without adding diluent adding to the mass 2–3.5 parts of water per part of lower fatty acid in an amount sufficient to cause precipitation of the cellulose dicarboxylic acid ester therein.

2. A method of preparing cellulose ether phthalate which comprises reacting upon 1 part of ethyl cellulose containing free and esterifiable hydroxyl groups with an esterification mass essentially consisting of not more than 3 parts of phthalic anhydride as the esterifying reagent, not more than 3 parts of lower fatty acid as the solvent therein and a basic catalyst until a product is obtained having alkali solubility, cooling the mass to 50–100° F. and without adding diluent adding to the mass 2–3.5 parts of water per part of lower fatty acid in sufficient amount to precipitate the cellulose ether phthalate.

3. A method of making cellulose acetate phthalate which comprises reacting upon 1 part of a cellulose acetate having free and esterifiable hydroxyl groups with a reaction mass essentially consisting of not more than 3 parts of phthalic anhydride as the esterifying reagent therein, not more than 3 parts of lower fatty acid as the solvent and a basic catalyst until a product which is alkali soluble is obtained, then cooling the mass to 50–100° F. and without adding diluent, adding to the mass 2–3.5 parts of water per part of lower fatty acid therein in an amount sufficient to cause precipitation of the cellulose acetate phthalate.

4. A method of preparing cellulose acetate phthalate which comprises reacting upon 1 part of partially hydrolyzed cellulose acetate with an esterification mass essentially consisting of not more than 3 parts of phthalic anhydride as the esterifying reagent, not more than 3 parts of acetic acid as the solvent and sodium acetate as the catalyst until a product which is alkali soluble is obtained, then cooling the mass to 50–85° F. and without adding diluent, adding to the mass 2–3.5 parts of water per part of acetic acid in an amount sufficient to precipitate the cellulose acetate phthalate therein.

5. A method of preparing cellulose acetate phthalate which comprises reacting upon 1 part of partially hydrolyzed cellulose acetate with an esterification mass essentially consisting of not more than 3 parts of phthalic anhydride as the esterifying reagent, not more than 3 parts of acetic acid as the solvent and sodium acetate as the catalyst until a product which is alkali soluble is obtained, then cooling the mass to 50–85° F., and without adding diluent, adding to the mass 2–3.5 parts of water per part of acetic acid in an amount sufficient to precipitate the cellulose acetate phthalate therein and neutralizing the catalyst therein by the addition of mineral acid.

6. A method of preparing cellulose ether phthalate which comprises reacting upon 1 part of cellulose ether having free and esterifiable hydroxyl groups with a reaction mass essentially consisting of not more than 3 parts of phthalic anhydride as the esterifying reagent, not more than 3 parts of acetic acid as the solvent and sodium acetate catalyst, until a product having alkali solubility is obtained, then cooling the mass to 50–80° F., and without adding diluent, adding to the mass 2–3.5 parts of water per part of acetic acid in an amount sufficient to precipitate the cellulose ether phthalate from the mass.

7. A method of preparing cellulose ether phthalate which comprises reacting upon 1 part of cellulose ether having free and esterifiable hydroxyl groups with a reaction mass essentially consisting of not more than 3 parts of phthalic anhydride as the esterifying reagent, not more than 3 parts of acetic acid as the solvent and sodium acetate catalyst, until a product having alkali solubility is obtained, then cooling the mass to 50–80° F., and without adding diluent, adding to the mass 2–3.5 parts of water per part of acetic acid in an amount sufficient to precipitate the cellulose ether phthalate from the mass and neutralizing the catalyst therein by adding mineral acid.

References Cited in the file of this patent

UNITED STATES PATENTS

| | | |
|---|---|---|
| 2,183,982 | Blanchard et al. | Dec. 19, 1939 |
| 2,245,208 | Malm et al. | June 10, 1941 |
| 2,285,536 | Seymour et al. | June 9, 1942 |
| 2,352,261 | Hiatt et al. | June 27, 1944 |
| 2,555,050 | Lyne et al. | May 29, 1951 |
| 2,753,339 | Malm et al. | July 3, 1956 |
| 2,759,909 | Hiatt et al. | Aug. 21, 1956 |